United States Patent [19]

Kondoh

[11] Patent Number: 4,760,750

[45] Date of Patent: Aug. 2, 1988

[54] VIBRATION ABSORPTION APPARATUS FOR RECIPROCATING OBJECT

[75] Inventor: Shiroh Kondoh, Kanagawa, Japan

[73] Assignee: Ricoh Company, Ltd., Tokyo, Japan

[21] Appl. No.: 288,783

[22] Filed: Jul. 31, 1981

[30] Foreign Application Priority Data

Aug. 1, 1980 [JP] Japan ............................ 55-105973

[51] Int. Cl.⁴ ............................ F16H 27/02

[52] U.S. Cl. ............................ 74/89.2; 358/293; 409/141

[58] Field of Search ............ 74/89.2, 89.21, 89.22, 74/110; 409/141, 237; 400/320; 358/293, 285

[56] References Cited

U.S. PATENT DOCUMENTS

| | | | |
|---|---|---|---|
| 2,393,907 | 1/1946 | Herfurth | 409/141 |
| 2,761,981 | 9/1956 | Axelrod | 74/110 |
| 2,884,573 | 4/1959 | Watson | 74/110 |
| 3,356,331 | 12/1967 | Springuel | 248/602 |
| 3,388,604 | 6/1968 | McFarland et al. | 74/89.22 |
| 3,421,637 | 1/1969 | Sofy | 74/110 |
| 3,762,232 | 10/1973 | Muller | 74/89.22 |
| 4,198,871 | 4/1980 | Dunn et al. | 74/89.2 X |
| 4,235,421 | 11/1980 | Phillips | 74/110 X |
| 4,236,605 | 12/1980 | Lindbergh | 74/89.22 X |
| 4,266,251 | 5/1981 | Hara et al. | 358/286 |
| 4,281,556 | 8/1981 | Weishew | 74/110 X |

FOREIGN PATENT DOCUMENTS

| | | | |
|---|---|---|---|
| 0036739 | 9/1981 | European Pat. Off. | 400/320 |
| 0046154 | 4/1981 | Japan | 74/89.22 |

OTHER PUBLICATIONS

IBM Technical Disclosure Bulletin, vol. 25, No. 20, Feb. 1983, pp. 4675–4676, "Counterweighted Print Head Drive".

*Primary Examiner*—Lloyd A. Gall
*Attorney, Agent, or Firm*—Oblon, Fisher, Spivak, McClelland & Maier

[57] ABSTRACT

A vibration absorption apparatus for a reciprocating object, in which the reciprocating object is reciprocated along a pair of parallel tracks and a vibration absorption member is moved in the direction opposite to the movement of said reciprocating object.

7 Claims, 3 Drawing Sheets

VIBRATION ABSORPTION APPARATUS FOR RECIPROCATING OBJECT

BACKGROUND OF THE INVENTION

The present invention relates to a vibration absorption apparatus for a reciprocating object.

In facsimile apparatus or printers, a carriage which carries a reading head or a recording head is reciprocated in the main scanning direction with a predetermined stroke. Such a carriage is disclosed in detail in U.S. Pat. No. 4,266,251 relating to facsimile transmission and reception apparatus. In particular, in the U.S. patent, an apparatus for reciprocating a carriage which bears both a reading head and a recording head is disclosed.

When such a carriage is reciprocated, the carriage is moved in one direction with acceleration of dV/dt, and the speed of the carriage is then reduced, with application of acceleration of −dV/dt to the carriage, and finally the carriage is stopped. The carriage is then moved in the opposite direction with the same acceleration as mentioned above. Thus, when the acceleration of dV/dt is applied to the carriage during the reciprocal movement thereof, reaction of −m(dV/dt) applied to the casing of an apparatus for supporting carriage, wherein m is the mass of the carriage. During the reciprocal movement of the carriage, that reaction is applied to the casing in repetition and because of the reaction, a base on which the apparatus is placed, for instance, a desk, is caused to vibrate with its proper frequency and with an amplitude proportional to a vibramotive force f (=−m(dV/dt)). Such vibrations are not only unpleasant to the operator, but also undesirable from the viewpoint of safety, and such vibrations may make the room where the facsimile apparatus is placed noisy, for instance.

SUMMARY OF THE INVENTION

It is therefore an object of the present invention to provide, from the viewpoint of the above-mentioned problems, a vibration absorption apparatus capable of effectively absorbing vibrations caused by reciprocating objects, for instance, the above-mentioned carriage which bears heads.

According to the present invention, this object is attained by a vibration absorption apparatus comprising a vibration absorption member which can be reciprocated along a track parallel to the reciprocating direction of an object to be reciprocated, in the direction opposite to the movement direction of the object.

By moving the vibration absorption member in the direction opposite to the movement direction of the reciprocating object, a negative vibramotive force is generated in the casing of an apparatus for reciprocating the object when the object is moved with a positive vibramotive force. As a result, substantially, no vibrations are caused in the object and even if vibrations are caused, such vibrations are extremely slight.

Furthermore, according to the present invention, when the mass of vibration absorption member is adjusted so as to be equal to or smaller than that of the object to be reciprocated, vibrations can be remarkably reduced and therefore such construction is extremely effective for practical use.

Furthermore, when an apparatus according to the present invention is designed in such a manner that the vibration absorption member is moved by the reciprocating means for the object to be reciprocated, the construction of the apparatus can be significantly simplified.

DETAILED DESCRIPTION OF THE PREFERRED EMBODIMENTS

Figure 1:
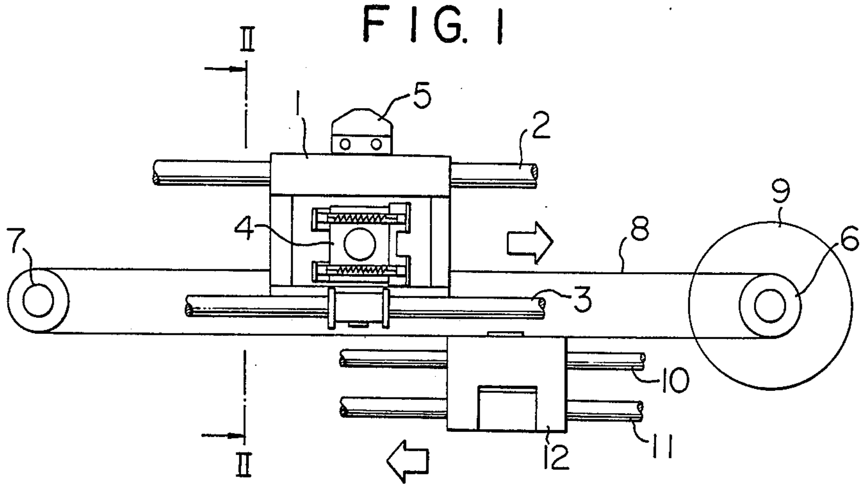
FIG. 1 is a diagrammatical view of a facsimile apparatus in which a vibration absorption apparatus according to the invention is incorporated.
Figure 2:
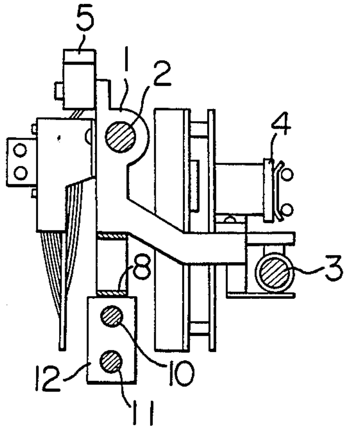
FIG. 2 is a section taken on line II—II in FIG. 1.

Referring to FIGS. 1 and 2, an embodiment of a vibration absorption apparatus according to the invention will now be explained.

In FIGS. 1 and 2, reference numeral 1 represents a carriage. The carriage 1 is supported by a pair of parallel shafts 2, 3, so that the carriage 1 can be reciprocated horizontally in FIG. 1, that is, in the main scanning direction. The carriage 1 carries a reading head 4 and a recording head 5 thereon.

To the carriage 1 is connected one extended portion of a timing belt 8 which is trained over pulleys 6 and 7, so that when the pulley 6 is driven in rotation, clockwise or counterclockwise in FIG. 1, by a motor 9, the carriage 1 is reciprocated in the main scanning direction with a predetermined stroke.

Furthermore, there are provided a pair of parallel guide shafts 10, 11, which are disposed parallel to the first-mentioned guide shafts 2, 3. A balance weight 12, which serves as a vibration absorption member, is mounted on the guide shafts 10 and 11 in such a manner that the balance weight 12 can be moved along the guide shafts 10, 11 in the axial direction thereof. The balance weight 12 is connected to another extended portion of the timing belt 8, so that the balance weight 12 can be driven through the timing belt 8. When the balance weight 12 is driven, it is moved in the direction opposite to the movement direction of the carriage 1. More specifically, when the carriage 1 is moved to the right in FIG. 1, the balance weight 12 is moved to the left, while when the carriage 1 is moved to the left, the balance weight 12 is moved to the right. Since the balance weight 12 and the carriage 1 are driven by one and the same driving system, their movement speed is equal to each other, although they are moved in the opposite directions.

As mentioned above, by the movement of the balance weight 12 at the same speed as that of the carriage 1, but in the opposite direction to that of the carriage 1, force, f' (=m'dv/dt), is applied to the casing of the apparatus for reciprocating the carriage 1, where m' is the mass of the balance weight 12.

Hence the vibramotive force F of the balance weight is as follows:

$$F=f+f'=m'dv/dt-mdv/dt=(m'-m)\ dv/dt$$

As can be seen from the above equation, when m'=m, the vibramotive force F is zero (0) and therefore no vibramotive force is generated. Therefore, when the mass of the balance weight 12 is selected so as to meet the condition of m'=m, substantially no vibrations are generated.

By setting the mass of the carriage 1, taking into consideration the capacity of the motor, the mass of the carriage 1 and other factors, the vibration can be significantly reduced for practical use.

Figure 3:
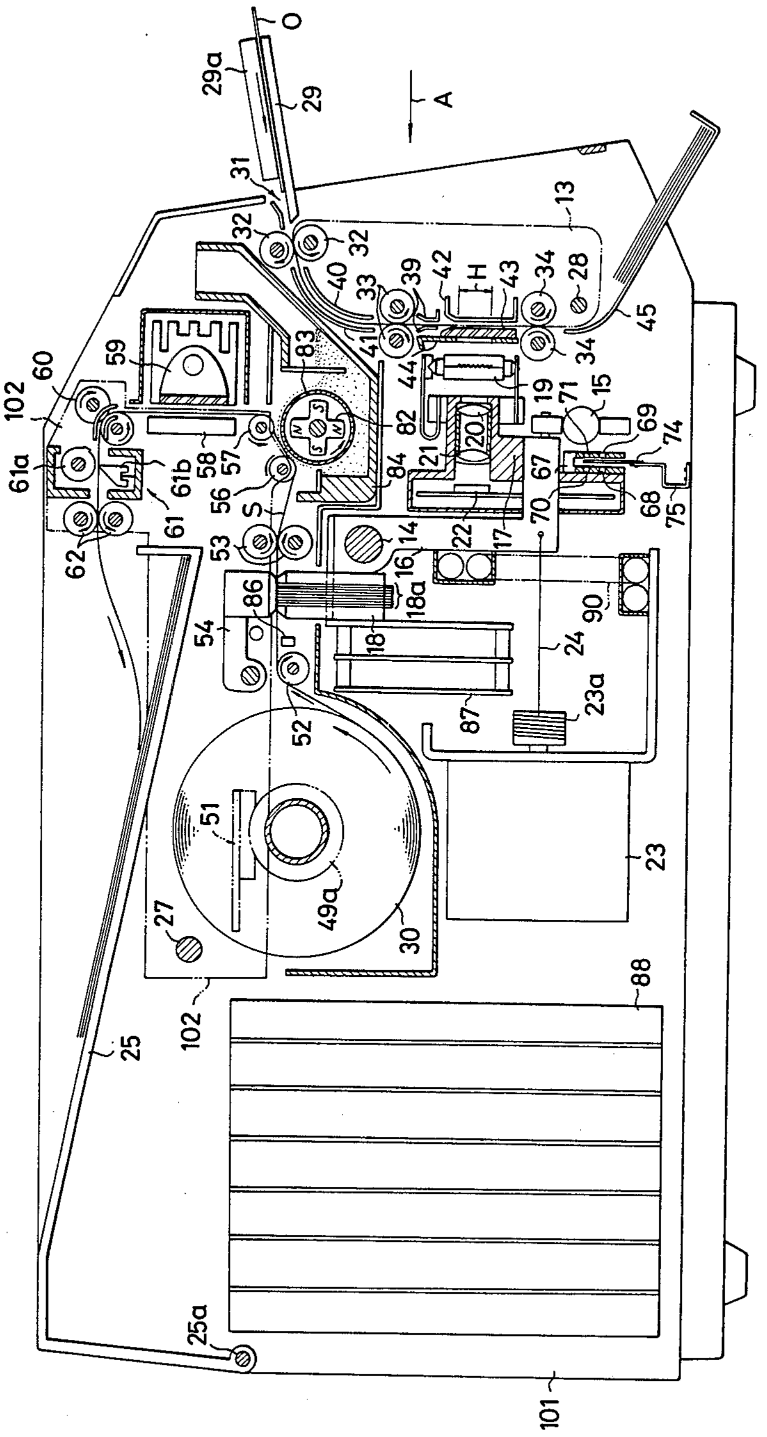
FIG. 3 is a sectional view of a facsimile apparatus which is employed as an example, to which an apparatus according to the is applicable.

With reference to FIG. 3, one example of an apparatus will be described, to which the invention is applicable. The apparatus is a facsimile transmitter/receiver, which contains a carriage, having a read and a record head, equivalent to the carriage referred to in the present invention. This apparatus mainly comprises a main scanning apparatus system, an original transportation apparatus system, and a record sheet transportation apparatus system in addition to a development apparatus, an image fixing apparatus and a record sheet cutting apparatus. Each of the above-mentioned systems will be explained.

(1) Main Scanning Apparatus System

Figure 4:
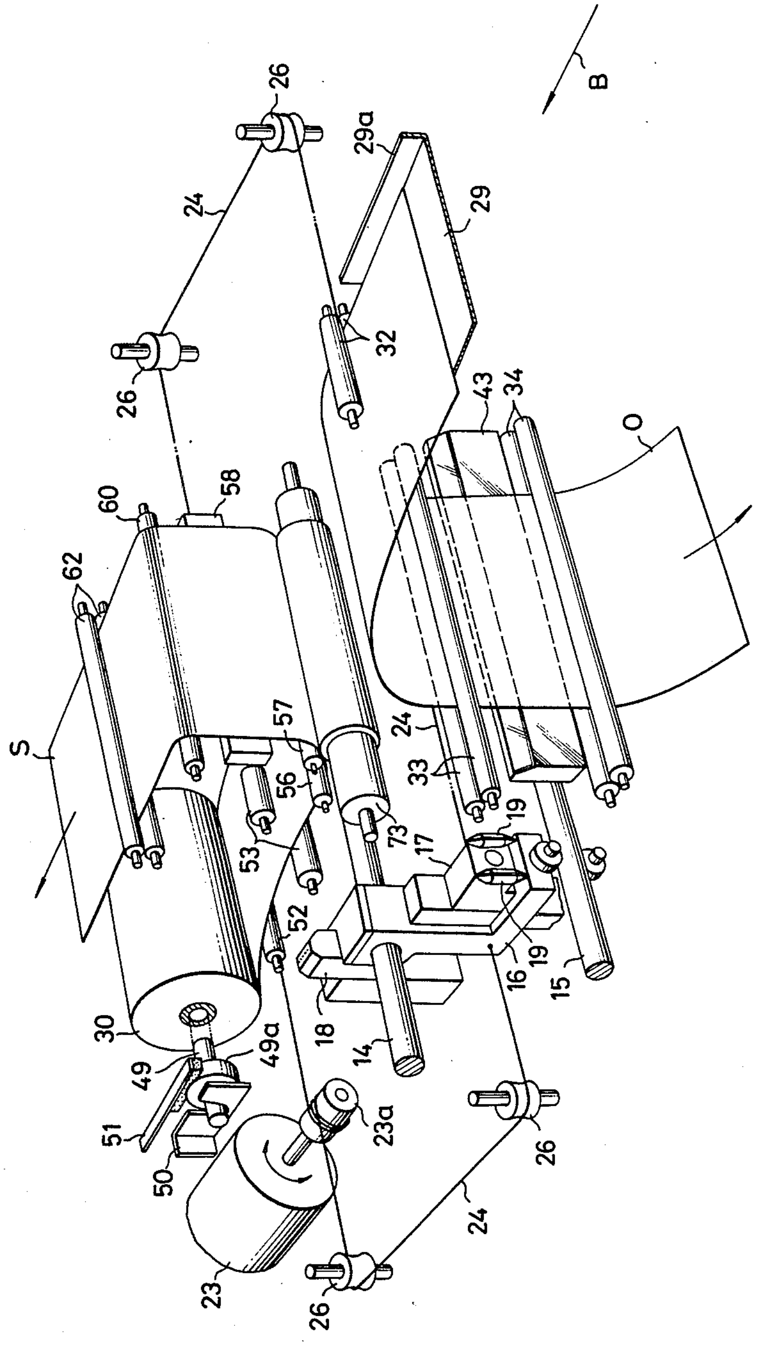
FIG. 4 is a perspective view of the main portions of the facsimile apparatus shown in FIG. 3.

Referring to FIGS. 3 and 4, to a carriage 16 supported by parallel guide shafts 14 and 15 are fixed a read head 17 and a record head 18. At the front end portion of the read head 17 is disposed an original illumination lamp 19, and inside the read head 17 are disposed image formation lenses 20, 21, and a solid sensor 22 (which will be described later). The record head 18 is disposed in the direction normal to the optical axis of the image formation lenses 20, 21. Around a drive pulley 23*a* of a servomotor 23, for example, which drives the carriage 16, there is wound a wire 24 which is trained over pulleys 26 disposed in the positions as shown in FIG. 4. Both ends of the wire 24 are connected to the carriage 16*a*, respectively. The carriage 16 is moved forwards and backwards together with the heads 17, 18 within a predetermined stroke along the guide shafts 14, 15 by the normal and reverse rotations of the servomotor 23 through the wire 24.

(2) Original Transportation Apparatus System

Referring to FIG. 3, in operating the present apparatus in practice, an operation button (not shown) is depressed on the right side of the apparatus and, at the same time, the original is inserted in the direction of the arrow A. Hence, the portion of the apparatus toward which the arrow points is referred to as the operation front side. On the operation front side is disposed an original stacking tray 29 that projects from the operation front side. Furthermore, on the operation front side is disposed an original insertion inlet 31 for inserting originals into the apparatus. A pair of original insertion rollers 32 are disposed on the forward end side of the original stacking tray 29. Furthermore, downstream of the rollers 32 are disposed a pair of paper feed rollers 33 and a pair of paper discharge rollers 34 in this order. The lower original insertion roller 32, the right side paper feed roller 33 and the right side paper discharge roller 34 are connected by an endless belt through their respective pulleys, not shown. By the rotation of a drive step motor, not shown, the above-mentioned rollers are rotated intermittently, whereby the other rollers are driven at the same time.

Between the original insertion rollers 32 and the paper feed rollers 33 are disposed curved original transportation guide plates 40, 41. Between the paper feed rollers 33 and the paper discharge rollers 34 are disposed an original holding plate 42, a contact glass 43 and a support plate 44 for supporting the contact glass 33. Furthermore, downstream of paper feed rollers 34 is disposed an original discharge tray 45 for guiding the originals and for holding them thereon.

(3) Record paper Transportation Apparatus System

Referring to FIG. 3, in the central portion of the present apparatus is disposed parallel to the guide shaft 14 a record paper roll 30 in which an electrostatic record sheet S is rolled. As shown in FIG. 4, the paper roll 30 is attachable to and detachable from a holder shaft 49 supported by an immovable support bracket 50 and can be fixed to the holder shaft 49. In FIG. 3, a curl correction roller 52 and a pair of main paper feed rollers 53 are disposed on the right side of the record paper roll 30, respectively. The curl correction roller 52 and the main paper feed rollers 53 constitute recording paper transportation means for transporting the record paper S horizontally. Numerals 56 and 57 represent register rollers for use during development. Numeral 58 represents a heat application plate for image fixing, numeral 59 a heat application lamp for image fixing, and numeral 60 transportation rollers. Furthermore, numeral 61 represents an automatic sheet cutting apparatus having a rotary cutter 61*a* and a cutter 61*b*. A pair of record paper discharge rollers 62 are disposed on the right side of the apparatus 61.

The lower main paper feed roller 53 is driven intermittently in the direction of the arrow by a rotation drive apparatus, not shown. Furthermore, any one of the record paper discharge rollers 62 is likewise driven.

In the facsimile transmisson/reception apparatus, the read scan and the record scan are conducted as follows. Each of the facsimile transmission/reception apparatus is provided with a read head and a record head so that both transmission and reception can be performed. When operating the apparatus in practice, on each of the transmission and the reception side, one apparatus is set, so that read scanning is performed by use of only the read head on the transmission side, while record scanning is performed by use of only the record head on the reception side. In practice, transmission and reception by using the facsimile apparatus are conducted as mentioned above. However, for convenience of explanation, both the read and the record scanning will be explained by use of one facsimile apparatus.

In the apparatus as shown in FIG. 3, an upper housing 102 having the record paper transportation system, the heat application plate 58 for image fixing and the automatic record paper cutting apparatus 61 can be opened about the shaft 27 at a slant opening position. At this position, the upper housing 102 is locked by an appropriate means. At the position shown, the record paper S is pulled out from the paper roll 30 which has been mounted on the holder shaft 49 (FIG. 4), so that the leading edge of the record paper S is caught between the paper discharge rollers 60. When the paper roll 30 is mounted in the body of the apparatus 101, the upper housing 102 is opened by 90 degrees or more from the position as shown in FIG. 3. In this case, an upper cover 25 for holding the discharged paper therein is rotated about a shaft 25*a* to open the cover 25.

After the leading edge of the record paper S is caught between the paper discharge rollers 60, the housing 102 is closed by pivoting it to the position as shown in FIG. 3. Thus, the apparatus is set ready for transmission or reception. Then, an original 0 is stacked on the original stacking tray 29 with the image bearing side up, and is inserted into the original insertion inlet 31 with its one side edge in contact with a guide member 29a (FIG. 4) of the original stacking tray 29. Between the original insertion rollers 32 and the original stacking tray 29 is disposed an original position detecting sensor (not shown). When the sensor detects the leading edge of the original, the original insertion rollers 32, paper feed rollers 33 and paper discharge rollers 34 are rotated in the direction of the respective arrows. When the leading edge of the original is caught between the original insertion rollers 32, the original is automatically transported into the apparatus.

The original 0 is transported by the rotation of the original insertion rollers 23 and is then caused to advance between the transportation guide plates 40, 41, which change the travelling direction of the original so as to be almost normal to the inserting direction. The leading edge of the original is then caught between the paper feed rollers 33. Another original position detecting sensor (not shown) is disposed between original guide members 39 which are disposed between a set of the original holding plate 42 and the contact glass 43 and the paper feed rollers 33. When the original is transported by a predetermined length after its leading edge has been detected by the original position detecting sensor, the above rollers temporarily stop, and the paper feeding is stopped in this condition. Hereafter, an area indicated by symbol H between the original holding plate 42 and the contact glass 43 will be referred to as an original reading section. The leading edge of the original reaches the original reading section. The original 0 is continuously transported to the original reading section. However, but when it is subject to read scanning, the original 0 is transported intermittently as will be described in detail. The read scanning is ready when the leading edge of the original comes to the original reading section.

When the read scanning is ready, the servomotor 23 shown in FIG. 4 begins to rotate. At the same time, the carriage 16 is moved back and forth by the driving action of the wire 24. To be more specific, the carriage 16 is reciprocated between a start position and an end position with respect to the original by the normal and the reverse rotation of the servomotor 23. The movement direction of the original 0 is defined as sub-scanning direction while the direction normal to the sub-scanning direction is defined as the main scanning direction.

As mentioned previously, when the servomotor 23 starts rotating, the carriage 16 begins to reciprocate. During the first forward movement of the carriage, the image information, on the leading edge of the original 0 positioned in the region indicated by the symbol H between the original holding plate 42 and the contact glass 43 in FIG. 3, is read by the solid sensor 22 disposed within the read head 17 which is moved facing the image information. In other words, light from the original illumination lamp disposed at the front end of the head 17 passes through the contact glass 43 and is reflected on the original surface. The reflected light passes through the lenses 20, 21 and is projected on the solid sensor 22.

The solid sensor 22 comprises read elements aligned in one direction, that is, in sub-scanning direction, such as an array of multiple photodiode elements, having a self-scanning function as is wellknown. Therefore, scanning of plural lines corresponding to the number of photodiode array can be performed by one scanning at a time by moving the read head in the main scanning direction while performing the self-scanning in the sub-scanning direction which is the moving direction of the original 0. For example, when the photodiode array consists of 64 elements, the scanning for 64 lines can be performed simultaneously. When the scanning line density is set at 8 lines/mm, the read width L for the 64 lines is about 8.3 mm.

Referring to FIG. 3, the image information in the leading edge of the original 0 is read by the solid sensor 22 during the forward movement of the read head 17 in the original read section indicated by symbol H. When the head 17 is then returned to its start position, the original insertion rollers 32, paper feed rollers 33 and paper discharge rollers 34 begin to rotate. Then, the original 0, with its leading edge caught by the paper discharge rollers 34, is transported from the upper portion to the lower portion. In this case, the original is transported intermittently in the sub-scanning direction by the transportation distance L (same as the read distance mentioned above). Each time the read head 17 completes one reciprocating movement, the original is intermittently transported by the paper discharge rollers 34, so that image information is read continuously from the leading edge of the original to the trailing edge thereof. Thereafter, when the trailing edge of the original is detected by the original position detecting sensor disposed at the guide member 39 and the original is transported by a predetermined distance from the position, with the image information in the trailing edge of the original read, the carriage 16 is returned to its start position, so that the read scanning is completed.

However, the original 0 is still transported by the paper discharge rollers 34, with its travelling direction changed to the operation front side of the apparatus by the guide action of the original discharge tray 45, and is then discharged and held on the original discharge tray 45. The original 0 is discharged on the tray 45 with the image information side position reversed with respect to its position in the tray 45, so that in the tray the image information side faces down. Therefore, when images of a stack of originals are transmitted successively, the originals are stacked on the tray 45 in the order of transmission with their image information bearing sides down. This causes the originals to be stacked in the order of pages, and it is not necessary to change the order of the originals to get them back in the order of pages at this stage.

As mentioned previously, the solid sensor 22 is disposed inside the read head 17, and with the movement of the read head 17, the images of the original are successively read dot-like in the main scanning direction by the photodiode array, so that the read images are successively converted into the image signals. In this case, when the original image is successively read dot-like, the read scanning pitch in the main scanning direction can be set in may ways. In general, this is represented in terms of line density, for example, 8 lines/mm. In the present facsimile transmission/reception apparatus, the following system is adopted in order to set such scanning pitches.

To be more specific, referring to FIG. 3, in a detecting member 67 fixed to a lower portion of the read head 17, a light source 68, such as a lamp and a light emitting diode, and a photosensor 69, which constitutes a counterpart of the light source 68, so that both face each other. Above these members are likewise disposed a light source 70 and a photosensor 71 which is the counterpart of the light source 70. These two sets of the detecting devices function as the so-called photocoupler.

On the other hand, between these detecting devices is disposed a slit pattern 74 made of a film of etching plate or the like in the main scanning direction, and fixed to the body of the facsimile apparatus by an attachment member 75. In the slit pattern 74 are formed a number of slits (not shown) spaced n times the pitch of the line density in the main scanning direction at the time of reading, where $n \geqq 1$. When the line density in the main scanning direction is 8 lines/mm, for example, the slit pitch is 0.125 mm, and the slits are equally spaced and distributed in all the range corresponding to the movement range of the carriage 16.

As the carriage 16 is moved in the main scanning direction, the read head 17 and the detection member 67 are moved integrally with the carriage 16 in the same direction. At this moment, slit marks (not shown) of the slit pattern 74 are successively read by the photocoupler comprising light source 68 (FIG. 3) and photosensor 69 disposed under the detecting member 67. The successive signal having a predetermined period or the so-called clock pulse, obtained by the above-mentioned reading, are applied in order of time to the solid sensor 22 of the read head 17 in the form of drive pulses through a control circuit (not shown), so that reading in the main scanning direction is conducted. In other words, the reading position of each image element at the time of transmission is determined by the pitch corresponding to the above-mentioned signals. That is, the scanning pitch in the main scanning direction is determined by the slit pattern. At the same time, the recording pitch at the time of recording can be also determined by the slit pattern.

The scanning pitch is determined by the slit pattern for reading and recording. Even if the speed of the carriage 16 is changed somehow, the respective reading positions and recording positions are always constant. Accordingly, deviation of image does not occur, so that copies of excellent image quality can be obtained.

The record scanning system of the apparatus will now be explained. Referring to FIG. 3, the record paper S is the conventional rolled electrostatic record paper. First, the paper S is pulled out from the paper roll 30, and the leading edge of the paper is caught between the discharge rollers 62.

Referring to FIG. 3, as the apparatus begins to operate, the carriage 16 also begins to move forwards in the main scanning direction. The main feed rollers 53 are also rotated by the driving action of a step motor (not shown). Furthermore, the record paper discharge rollers 62 begin to rotate by another drive motor, whereby the record paper S is fed from the paper roll 30 and is transported in the sub-scanning direction which is normal to the movement direction of the carriage 16. At this moment, the upper portion of the record head 18 is moved into contact with the surface of the record paper, namely the surface to be recorded. By this movement, the surface of the paper in contact with the record head 18 is electrically charged for recording.

The record head 18 has recording styli, such as electrode styli 18*a*, whose ends are bare in the upper portion of the head 18. The styli are arranged in one or two rows in the sub-scanning direction. The number of the electrode styli is the same as that of the photodiode arrays of the solid sensor 22. Therefore, with one recording scan of the record head 18, the record charging is performed in the width equal to the read width L at the time of reading. The record paper is transported intermittently by the step motor, not shown.

The recording surface of the paper S is brought into contact with the upper portion of the record head 18 by means of the record paper holding member 54. The record head 18 is moved in the main scanning direction. At the same time, a dot-like electrostatic charging is successively applied on the surface of the record paper for forming a latent electrostatic image thereon by a signal voltage application means which grounds the backside of the record paper, without employing a signal voltage application means by use of discharging between the electrode styli 18*a* and auxiliary electrodes (not shown) or without employing the auxiliary electrodes. The latent electrostatic image is developed to a visible toner image by a dry type development apparatus comprising a magnet roller 82, a fixed sleeve 83, and a development tray 84.

The toner image is thermally fixed to the record paper S while the paper S is passing between the head application plate 58 and the lamp 59 for thermal image fixing. The lamp 59 is designed so as to be turned on and off in order to prevent its overheating. The heat application plate 58 is controlled with respect to its temperature for uniform image fixing and safety. After image fixing, the record paper S is cut in a length almost equal to that of the original by the automatic paper cutting apparatus 61 and is then discharged, by the discharge rollers 62, onto the upper cover 25 for holding the paper thereon.

Referring back to FIG. 3, the record paper S is intermittently transported during the recording scan by the intermittent rotation of the main feed rollers 53 and the transportation rollers 60. However, after the final portion of the recorded surface of the paper is charged completely, the paper S is continuously transported until its final portion passes through the automatic record paper cutting apparatus 61. Furthermore, between the curl correction roller 52 and the read head 18 is disposed a record paper final end detecting sensor 86, which detects the final end of the record paper roll 30. When the final end of the paper roll 30 is detected, the recording scan is stopped immediately.

Referring to FIG. 3, a brake member 41 is fixed to the side of the upper housing 102. The brake member 51 is designed so as to be brought into pressure contact with the peripheral surface of a flange 49*a* of the holder shaft 49 (FIG. 4) when the housing 102 is closed in the position as shown in FIG. 3. Therefore, the paper roll 30 is rotated under the braking action of the brake member 51, and a back tension is applied to the record paper, so that the record paper does not stack and the recording scan is performed with high accuracy by the head 18. At the same time, the record paper is uniformly brought into pressure contact with the upper portion of the head 18 with an appropriate contact pressure by the weight of a free end of the record paper holding member 54, so that recording scan can be performed accurately. Furthermore, an elastic member is attached to a portion of the holding member 54 with which the record paper is in contact, whereby the above-mentioned contact pressure is kept constant and abrasion of the upper portion of the head 18 is prevented.

A high voltage drive circuit for recording is installed in a unit 87 fixed to the carriage 16, as shown in FIG. 3. In an electrical device unit 88 on the left side of the apparatus in FIG. 3, there are printed boards comprising circuits for coding and compressing information, and modulation circuits for transmitting data to a telephone line. The electrical device unit 88 can be pulled out in the upper direction by opening the upper cover 25. Furthermore, reference numeral 90 in FIG. 3 represents a bundle of lead wires for the solid sensor 22 and the record head 18 or for the original illumination lamp 19. The bundle of wires are led from the carriage 16 and have enough slack so that the carriage 16 cam move back and forth freely. The bundle of lead wires 90 is inserted into a vinyl tube or the like, and around the vinyl tube there is a coil spring, so that the abrasion damage or disconnection of the lead wires is prevented by use of the flexibility of the coil spring.

In the above-mentioned apparatus, a unit body 13 on the original transportation side can be opened by rotating it clockwise about the shaft 28, so that originals jammed in the transportation path can be removed easily and the contact glass 33 can be easily cleaned.

Thus, there is provided in accordance with the present invention a vibration absorbing apparatus which has the advantages discussed above. The embodiment described is intended to be merely exemplary and those skilled in the art will be able to make variations and modifications in it without departing from the spirit and scope of the invention. All such modifications and variations are contemplated as falling within the scope of the claims.

What is claimed is:

1. A vibration absorption apparatus for an object driven in reciprocating motion comprising: an endless belt; moving means connected to said endless belt, said object being connected to said endless belt for driven motion by said moving means over one path of reciprocation; and a counterweight member connected to said endless belt for driven motion in a direction opposite to said object over another path of reciprocation parallel to said one path of said object.

2. A vibration absorption apparatus as in claim 1, wherein the mass of said counterweight member is substantially equal to or smaller than the mass of said object to be reciprocated.

3. A vibration absorption apparatus as in claim 1, wherein the movement speed of said counterweight member is substantially equal to the movement speed of said object to be reciprocated.

4. A vibration absorption apparatus as in claim 1, wherein means for moving said counterweight member is the same as the means for moving said object to be reciprocated.

5. A vibration absorption apparatus as in claim 1, wherein said object to be reciprocated is a carriage which carries thereon a reading head and record for use in facsimile apparatus, and said counterweight member is a balance weight.

6. A reading and recording apparatus for a facsimile machine comprising: a read head and a record head mounted on a carriage for reciprocating motion; and endless belt; moving means connected to said endless belt, said carriage being connected to said endless belt for driven motion by said moving means over one path of reciprocation; and a counterweight member connected to said endless belt for driven motion in a direction opposite to said carriage over another path of reciprocation parallel to said one path of said carriage.

7. A reading and recording apparatus as in claim 6 wherein said read head has read elements aligned in one direction normal to the direction of reciprocation of the carriage, and said record head has recording styli aligned in another direction normal to the direction of reciprocation of the carriage.

* * * * *